(12) United States Patent
Laurie et al.

(10) Patent No.: US 8,893,042 B2
(45) Date of Patent: Nov. 18, 2014

(54) DETERMINATION AND DISPLAY OF RELEVANT WEBSITES

(75) Inventors: Avrum S. Laurie, Toronto (CA); Jennifer C. Trahan, Kirkland, WA (US); John H. Lueders, Seattle, WA (US); Prashant Singh, Bellevue, WA (US); Louis A. Martinez, Redmond, WA (US); Jane T. Kim, Seattle, WA (US); Warren G. Stevens, Redmond, WA (US); Jess S. Holbrook, Seattle, WA (US); Kuei-Chih Sun, Sammamish, WA (US); Mary-Lynne Williams, Seattle, WA (US); Sarah J. Bowers, Snohomish, WA (US)

(73) Assignee: Microsoft Corporation, Redmond, WA (US)

( * ) Notice: Subject to any disclaimer, the term of this patent is extended or adjusted under 35 U.S.C. 154(b) by 242 days.

(21) Appl. No.: 12/881,742

(22) Filed: Sep. 14, 2010

(65) Prior Publication Data

US 2012/0066645 A1    Mar. 15, 2012

(51) Int. Cl.
G06F 3/048    (2013.01)
G06F 17/30    (2006.01)

(52) U.S. Cl.
CPC ................... *G06F 17/30873* (2013.01)
USPC ........................................... 715/811

(58) Field of Classification Search
USPC ........................................... 715/811
See application file for complete search history.

(56) References Cited

U.S. PATENT DOCUMENTS

| 7,082,573 | B2 | 7/2006 | Apparao et al. | |
|---|---|---|---|---|
| 7,203,909 | B1 | 4/2007 | Horvitz et al. | |
| 7,225,407 | B2 | 5/2007 | Sommerer et al. | |
| 7,634,476 | B2 | 12/2009 | Liu et al. | |
| 2005/0028104 | A1* | 2/2005 | Apparao et al. | 715/738 |
| 2007/0143694 | A1* | 6/2007 | Rakowski et al. | 715/760 |
| 2008/0301562 | A1* | 12/2008 | Berger et al. | 715/733 |
| 2009/0171930 | A1 | 7/2009 | Vaughan et al. | |
| 2009/0321402 | A1 | 12/2009 | Doyle et al. | |
| 2010/0070928 | A1 | 3/2010 | Goodger et al. | |
| 2010/0095219 | A1* | 4/2010 | Stachowiak et al. | 715/745 |
| 2010/0223252 | A1 | 9/2010 | Broman et al. | |
| 2010/0262596 | A1* | 10/2010 | Dumon et al. | 707/723 |
| 2011/0208732 | A1* | 8/2011 | Melton et al. | 707/728 |

FOREIGN PATENT DOCUMENTS

| CN | 1764916 | 4/2006 |
|---|---|---|
| WO | WO-0235335 | 5/2002 |

OTHER PUBLICATIONS

"Add-ons for Firefox: FoxTab 1.3", Retrieved from: <https://addons.mozilla.org/en-US/firefox/addon/8879/> on Aug. 4, 2010, (Jan. 22, 2010),7 pages.

"Explore Google Chrome Features: New Tab Page", Retrieved from: <http://www.google.com/support/chrome/bin/answer.py?hl=en&answer=95451> on Aug. 4, 2010, 1 pages.

(Continued)

*Primary Examiner* — William Bashore
*Assistant Examiner* — Hien Duong
(74) *Attorney, Agent, or Firm* — Bryan Webster; Kate Drakos; Micky Minhas (57) ABSTRACT

Various embodiments utilize certain events that occur within a Web browser to recognize an imminent intent, on the part of the user, to navigate to a website. Given such events, in combination with a user's past browsing patterns and history, an automated and personalized navigation solution can be provided to expedite navigation.

21 Claims, 5 Drawing Sheets

(56) References Cited

OTHER PUBLICATIONS

"Hide Most Visited Sites from New Tab in Google Chrome in Easy Steps", Retrieved from: <http://www.techrena.net/internet/remove-most-visited-sites-from-new-tab-in-google-chrome-in-easy-steps/> on Aug. 4, 2010, (Apr. 10, 2009),7 pages.

"PageRank", Retrieved from : <http://en.wikipedia.org/wiki/PageRank> on Aug. 4, 2010 (Aug. 3, 2010),15 pages.

"Safari Features", Retrieved from: <http://www.apple.com/safari/features.html> on Aug. 4, 2010, 17 pages.

Bilenko, Mikhail et al., "Mining the Search Trails of Surfing Crowds: Identifying Relevant Websites from User Activity", *In Proceedings of WWW 2008*, Available at <http://research.microsoft.com/pubs/64004/08-www.pdf>,(Apr. 2008),10 pages.

Dolcourt, Jessica "Opera 10 Browser is here", Retrieved from: <http://download.cnet.com/8301-2007 4-10320478-12.html> on Aug. 4, 2010, (Aug. 31, 2009),3 pages.

Wondrasek, Evan "Give Google Chrome's New Tab Page a Makeover with SpeedDial", Retrieved from: <http://www.makeuseof.com/tag/give-google-chromes-tab-page-makeover-speed-dial/> on Aug. 4, 2010, (Apr. 29, 2010),9 pages.

"International Search Report", Mailed Date: Mar. 27, 2012, Application No. PCT/US2011/049810, Filed Date: Aug. 31, 2011, pp. 9.

"Foreign Office Action", Chinese Application No. 201110270944.7, (Aug. 2, 2013), 11 Pages.

"Foreign Office Action", Chinese Application No. 201110270944.7, (Dec. 5, 2012), 12 pages.

"Foreign Office Action", CN Application No. 201110270944.7, Feb. 19, 2014, 18 Pages.

"Extended European Search Report", EP Application No. 11825661.9, May 9, 2014, 3 pages.

"Foreign Office Action", CN Application No. 201110270944.7, Aug. 29, 2014, 17 Pages.

\* cited by examiner

DETERMINATION AND DISPLAY OF RELEVANT WEBSITES

BACKGROUND

Research indicates that typical Internet users visit a relatively finite number of websites with daily regularity. For example, many users visit, on average, from between seven to twelve websites regularly. However, existing Web browser paradigms that are designed to expedite navigation such as, for example, the address bar, history store, and/or favorites or bookmarks utilize explicit user input and/or ongoing management from the user in order to function and remain relevant and useful. Explicit user intervention can, in many instances, discourage the sustained use of these features and, consequently, may cause a user to fall back to more labor-intensive navigation activities.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Various embodiments utilize certain events that occur within a Web browser to recognize an imminent intent, on the part of the user, to navigate to a website. Given such events, in combination with a user's past browsing patterns and history, an automated and personalized navigation solution can be provided to expedite navigation.

In one or more embodiments, a decay algorithm is employed to score URLs based on a user's visit frequency and visit recency. Based on a URL's score, an associated site can be selected for display in a layout that is configured to facilitate scan-ability, site recognition, and/or relevance of a site relative to other displayed sites.

BRIEF DESCRIPTION OF THE DRAWINGS

The same numbers are used throughout the drawings to reference like features.

DETAILED DESCRIPTION

Overview

Various embodiments utilize certain events that occur within a Web browser to recognize an imminent intent, on the part of the user, to navigate to a website. For example, one event can include creation of a new tab within the web browser, as well as others. Given such events, in combination with a user's past browsing patterns and history, an automated and personalized navigation solution can be provided to expedite navigation.

In one or more embodiments, a decay algorithm is employed to score URLs based on a user's visit frequency and visit recency. Based on a URL's score, an associated site can be selected for display in a layout that is configured to facilitate scan-ability, site recognition, and/or relevance of a site relative to other displayed sites.

In the discussion that follows, a section entitled "Operating Environment" is provided and describes one environment in which one or more embodiments can be employed. Following this, a section entitled "Example Decay Algorithm" describes an example decay algorithm in accordance with one or more embodiments. Next, a section entitled "Example Layout" describes an example layout in accordance with one or more embodiments. Following this, a section entitled "Example Methods" describes example methods in accordance with one or more embodiments. Last, a section entitled "Example System" describes an example system that can be utilized to implement one or more embodiments.

Operating Environment

Figure 1:
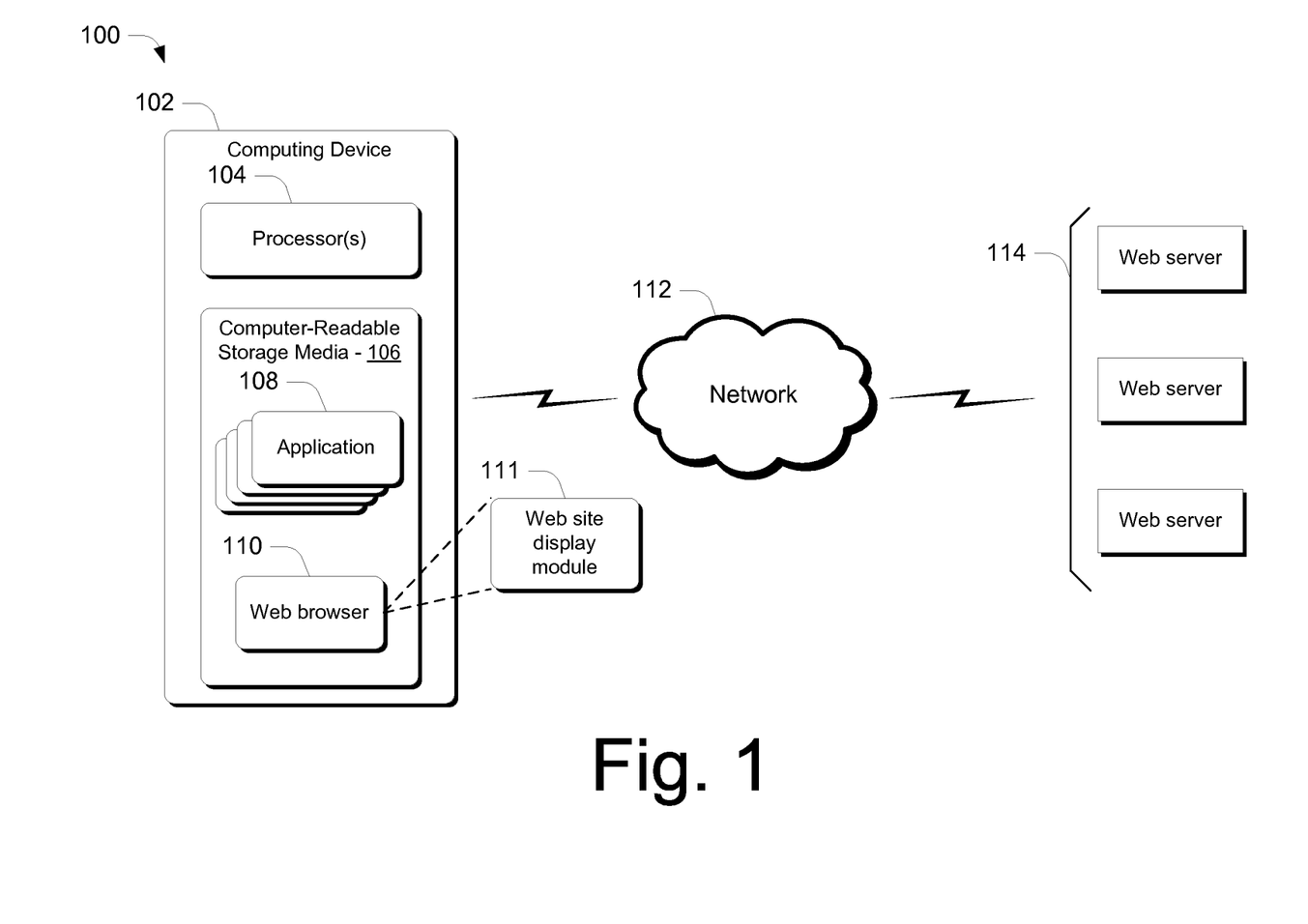
FIG. 1 illustrates an operating environment in which various principles described herein can be employed in accordance with one or more embodiments.

FIG. 1 illustrates an operating environment in accordance with one or more embodiments, generally at 100. Environment 100 includes a computing device 102 having one or more processors 104, one or more computer-readable storage media 106 and one or more applications 108 that reside on the computer-readable storage media and which are executable by the processor(s). The computer-readable storage media can include, by way of example and not limitation, all forms of volatile and non-volatile memory and/or storage media that are typically associated with a computing device. Such media can include ROM, RAM, flash memory, hard disk, removable media and the like. One specific example of a computing device is shown and described below in FIG. 6.

In addition, computing device 102 includes a software application in the form of a web browser 110 that includes or otherwise makes use of a web site display module 111 that operates as described above and below. In one or more embodiments, the web site display module is designed to utilize certain events that occur within a Web browser to recognize an imminent intent, on the part of the user, to navigate to a website. For example, as noted above, one event can include creation of a new tab within the web browser, as well as others. Given such events, in combination with a user's past browsing patterns and history, an automated and personalized navigation solution can be provided to expedite navigation, as described below in more detail. Additionally, in one or more embodiments, the web site display module can utilize a decay algorithm to score URLs based on a user's visit frequency and visit recency. Based on a URL's score, an associated site can be selected for display in a layout that is configured to facilitate scan-ability, site recognition, and/or relevance of a site relative to other displayed sites.

In addition, environment 100 includes a network 112, such as the Internet, and one or more web servers 114 from and to which content can be received and sent, as described above and below. Such content can include web pages that are received from the web servers.

Computing device 102 can be embodied as any suitable computing device such as, by way of example and not limitation, a desktop computer, a portable computer, a handheld computer such as a personal digital assistant (PDA), cell phone, and the like.

Having described an example operating environment, consider now a discussion of some example embodiments that can utilize web site display module 111.

Example Decay Algorithm

In one or more embodiments, a decay algorithm is employed to determine and present relevant websites associated with a user's browsing activities. The decay algorithm utilizes a measure of a user's website visits over time for individual websites that a user visits. This measure is referred to as the Relevant Visit Count or "RVC." The RVC is decayed, over time, if the user does not visit the corresponding site for a period of time. In one or more embodiments, the amount of decay applied is relative to how much time has passed since the user's last visit.

Any suitable type of decay algorithm can be utilized. In at least some embodiments, the decay algorithm can utilize the following parameters: the number of relevant days considered, the number of days between a current time and the last time a particular URL was visited, and the number of days between a current time and the last time the RVC was decayed. A new RVC may be calculated by multiplying the previously calculated RVC by a decay value. The decay value may be generated using the decay algorithm. In one or more embodiments, the decay algorithm can be applied to individual, single URLs when they are visited by a user and/or periodically across an entire history store that stores information associated with visited sites.

An example decay algorithm, in accordance with one embodiment, is shown just below:

$$\text{Decay} = \left(\frac{(R - (LV - LD))}{R}\right)$$

$$RVC_{new} = \text{Decay} * RVC_{old}$$

Where:

RVC is a calculated Relevant Visit Count.

$RVC_{old}$ is a previously calculated Relevant Visit Count.

$RVC_{new}$ is a newly calculated Relevant Visit Count.

R is a number of relevant days being considered, where R is a value other than 0.

LV is a number of days between a current time and a last time an associated URL was visited.

In the above-described example, the variable R can be considered as a window of interest, e.g., 30 days, 60 days, or the like. In at least some embodiments, this variable is a tunable variable that can be adjusted by the user.

Accordingly, the decay algorithm scores URLs based on a user's visit frequency and visit recency. Based on a URL's score, an associated site can be selected for display in a layout that is configured to facilitate scan-ability, site recognition, and/or relevance of a site relative to other displayed sites.

In addition, in at least some embodiments, additional selection criteria can be employed to ensure that a good cross-section of browsing activities is represented in the display. For example, in at least some embodiments, a single visual indicia associated with one URL from, at most, each fully-qualified domain can be displayed. A fully-qualified domain refers to a domain plus its hostname. For example, "maps.abc.com" is a different fully qualified domain than "news.abc.com". However, "abc.com/maps" and "abc.com/news" would be the same fully qualified domain.

Having considered an example decay algorithm, consider now an example layout that can be rendered by the Web browser using input from the decay algorithm.

Example Layout

As noted above, the decay algorithm can be employed to score URLs based on a user's visit frequency and visit recency. Based on a URL's score, an associated site can be selected for display in a layout that is configured to facilitate scan-ability, site recognition, and/or relevance of a site relative to other displayed sites. As an example, consider FIG. 2.

Figure 2:
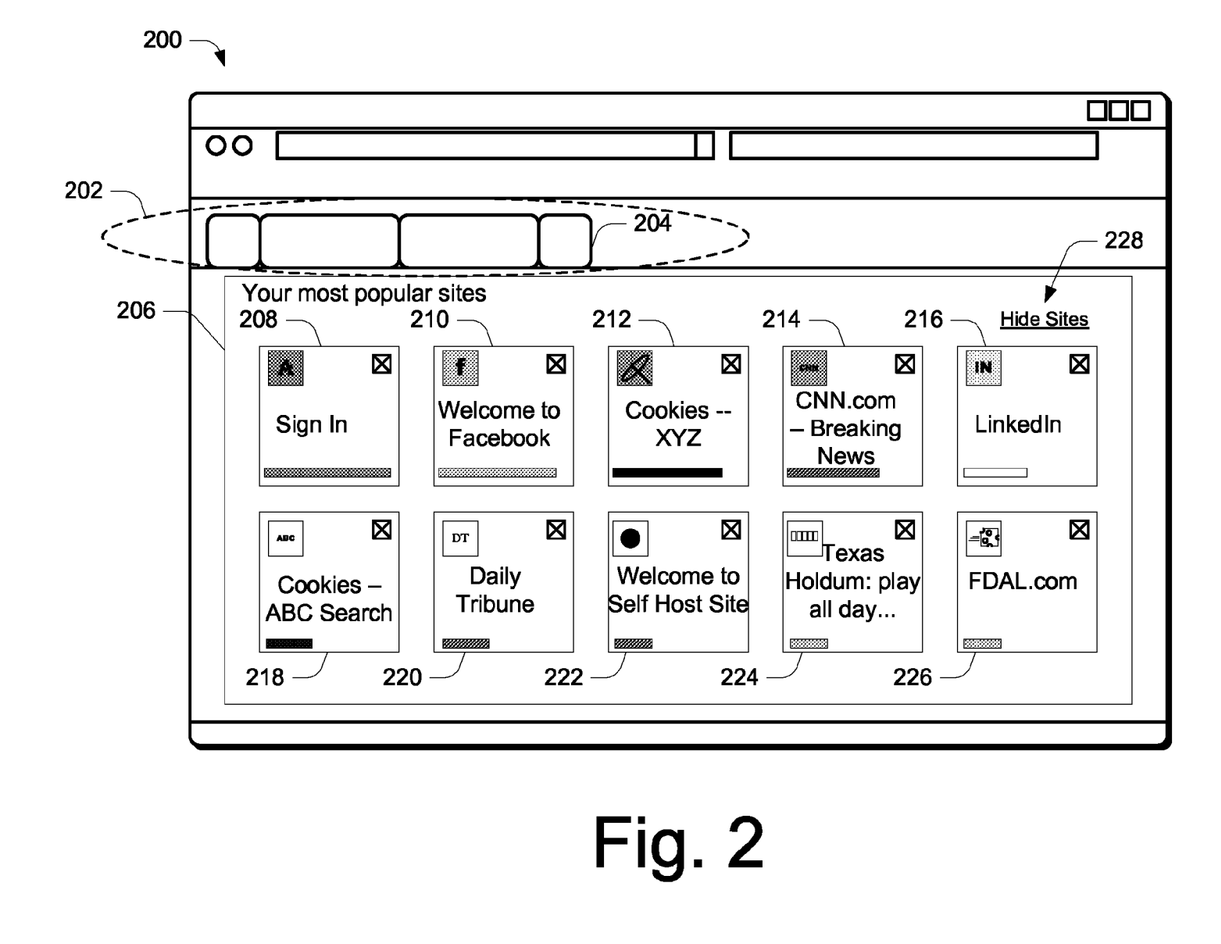
FIG. 2 illustrates an example web browser user interface in accordance with one or more embodiments.

There, a Web browser user interface is shown that generally at 200. The Web browser user interface includes the usual instrumentalities including a tab band 202 that can contain a plurality of tabs as well as a tab 204 that can be utilized to open a new tab. In addition, the Web browser user interface includes a layout 206 that presents a plurality of files each of which being associated with a different URL or website. In the present example, ten files are illustrated at 208, 210, 212, 214, 216, 218, 220, 222, 224, and 226, although any suitable number of files can be utilized.

Figure 3:
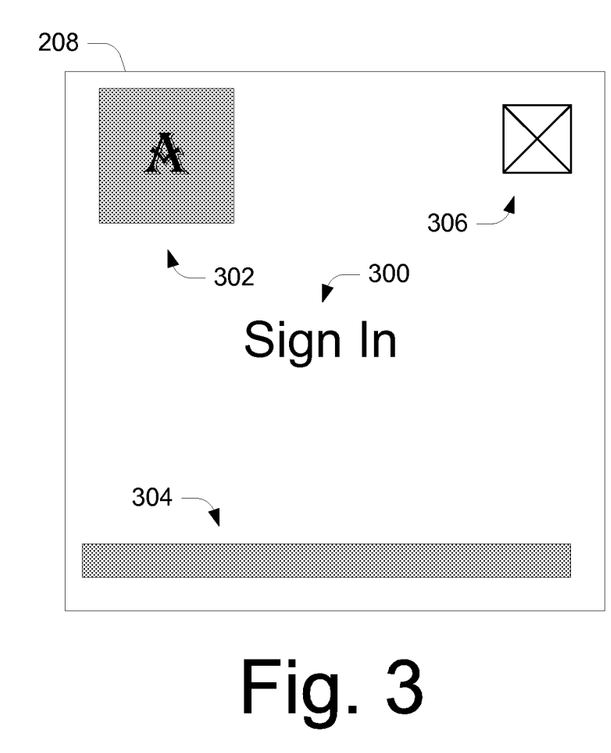
FIG. 3 illustrates an example file in accordance with one or more embodiments.

FIG. 3 illustrates file 208 in more detail, in accordance with one or more embodiments. As noted above, the layout is configured to facilitate scan-ability, site recognition, and/or relevance of a site relative to other displayed sites. To this end, and in accordance with one or more embodiments, individual files can include a site title 300 that identifies a particular website. Further, individual files can include an image 302 associated with the website. The image can comprise any suitable type of image such as, by way of example and not limitation, a site-provided icon, also termed a "favicon." As will be appreciated by the skilled artisan, images such as favicons can be tied to brand-identity for particular websites. This can facilitate quick identification of the website and hence, can promote scan-ability.

In one or more embodiments, individual files can include visual indicia associated with a particular site's relevance relative to other tile-associated sites. Any suitable type of visual indicia can be utilized. In one or more embodiments, visual indicia in the form of a small meter 304 can be utilized. A visual property of the visual indicia can be mapped to an associated website's relevant visit count. For example, in this particular instance, the length of the meter can be tied to the relevance of a particular site. For example, the longer the length of the meter, the more relevant a particular site would be. Meter lengths can be mapped to a site's RVC as computed above. Notice that in the FIG. 2 example, the tiles are displayed left-to-right, in descending order of relevance, as represented by each tile's meter.

In one or more embodiments, the visual indicia, in this case the individual meters, can be rendered to have different colors. The color of a particular meter can be extracted from a primary color of image 302.

In one or more embodiments, individual tiles can include other features. For example, an instrumentality 306 can be provided to enable user to click thereon to remove the tile from the layout. When this instrumentality is selected, the URL associated with the tile then appears on a list which ensures that nothing from the fully qualified domain associated with the website will appear in the layout.

Alternately or additionally, a "hide sites" feature can be included in the layout to allow a user to quickly hide tiles that are displayed. For example, in FIG. 2, a "hide sites" feature 228 is shown. Once clicked, individual tiles can be grayed out or otherwise obfuscated from view. Further, tile obfuscation can be utilized when, for example, a computer is in "presentation mode" such as when being used to present an overhead presentation to a group of individuals.

In one or more embodiments a site, as represented by a particular tile, can be pinned to a computer desktop's task bar. Such can be accomplished by dragging and dropping the particular tile onto the desktop's task bar. When this occurs, a local file can be created for the website that includes, among other data, a starting URL and a favicon. The favicon can be presented on the task bar and can be used to launch the website from the task bar by clicking thereon.

In at least some embodiments, perceived performance can be improved by decoupling the display of a new tab page visualization from creation of the new tab. Specifically, in the past, a new tab page would be rendered as an HTML page. So, for example, a "view source" operation would expose the HTML that makes up the new tab page. What this means is that in order for a new tab page to load, in the past, one would have to open a new tab, its associated process would have to spin up, and the HTML rendering engine would have to render and interpret the page for the new tab page. This can cause a perceived delay. In at least some embodiments, perceived performance can be improved in the following way. When a user clicks on a new tab instrumentality, a canvas is placed on top of where the tab will reside. In the background, the HTML rendering engine spins up and performs its processing in the background, thus leading to perceived improved page-loading performance.

Having described an example layout in accordance with one or more embodiments, consider now a discussion of example methods in accordance with one or more embodiments.

Example Methods

Figure 4:
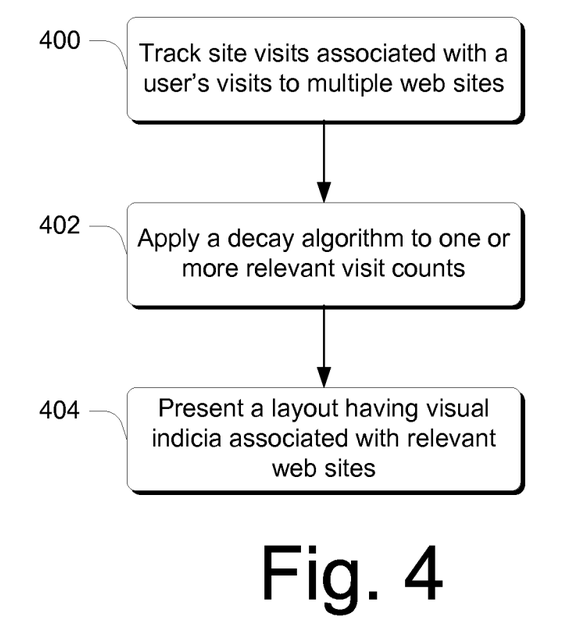
FIG. 4 is a flow diagram that describes steps in a method in accordance with one or more embodiments.

FIG. 4 is a flow diagram that describes steps a method in accordance with one or more embodiments. The method can be implemented in connection with any suitable hardware, software, firmware, or combination thereof. In at least some embodiments, the method can be implemented by a suitably configured Web browser and/or a suitably configured website display module as described above.

Step 400 tracks site visits associated with a user's visits to multiple websites. In one or more embodiments, tracking produces, for individual tracked sites, an associated relevant visit count as described above. Step 402 applies a decay algorithm to one or more relevant visit counts. Examples of how this can be done are provided above. Step 404 presents a layout having visual indicia associated with relevant websites, as represented by the websites' associated relevant visit count. Examples of how this can be done are described above.

Figure 5:
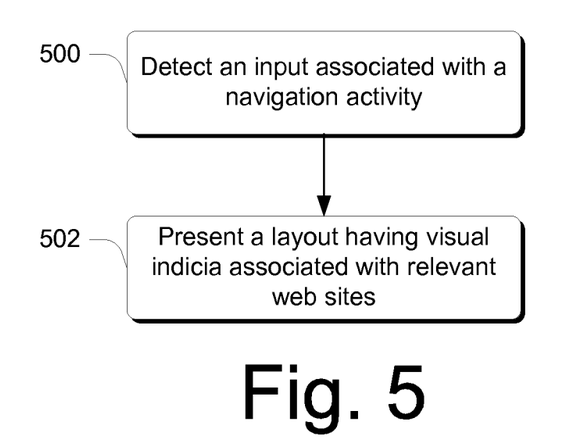
FIG. 5 is a flow diagram that describes steps in a method in accordance with one or more embodiments.

FIG. 5 is a flow diagram that describes steps a method in accordance with one or more embodiments. The method can be implemented in connection with any suitable hardware, software, firmware, or combination thereof. In at least some embodiments, the method can be implemented by a suitably configured Web browser and/or a suitably configured website display module as described above.

Step 500 detects an input associated with a navigation activity. Any suitable input can be detected. For example, inputs can include, by way of example and not limitation, detecting that a new tab has been or is to be opened, detecting that an address bar has been opened, detecting that a Web browser has been opened, and the like. Responsive to detecting the input, step 502 presents a layout having visual indicia associated with relevant websites. Examples of how this can be done are described above.

Having discussed example methods in accordance with one or more and embodiments, consider now a discussion of an example system that can be utilized to implement embodiments described herein.

Example System

Figure 6:
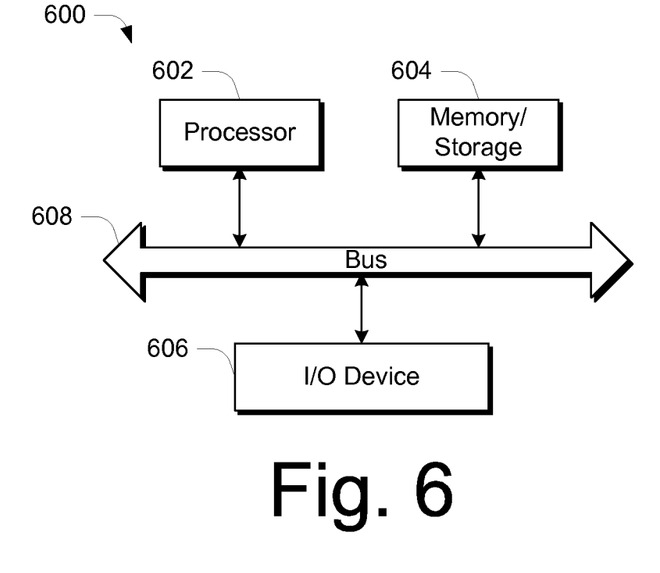
FIG. 6 illustrates an example system that can be used to implement one or more embodiments.

FIG. 6 illustrates an example computing device 600 that can be used to implement the various embodiments described above. Computing device 600 can be, for example, computing device 102 or Web server 114 of FIG. 1.

Computing device 600 includes one or more processors or processing units 602, one or more memory and/or storage components 604, one or more input/output (I/O) devices 606, and a bus 608 that allows the various components and devices to communicate with one another. Bus 608 represents one or more of any of several types of bus structures, including a memory bus or memory controller, a peripheral bus, an accelerated graphics port, and a processor or local bus using any of a variety of bus architectures. Bus 608 can include wired and/or wireless buses.

Memory/storage component 604 represents one or more computer storage media. Component 604 can include volatile media (such as random access memory (RAM)) and/or non-volatile media (such as read only memory (ROM), Flash memory, optical disks, magnetic disks, and so forth). Component 604 can include fixed media (e.g., RAM, ROM, a fixed hard drive, etc.) as well as removable media (e.g., a Flash memory drive, a removable hard drive, an optical disk, and so forth).

One or more input/output devices 606 allow a user to enter commands and information to computing device 600, and also allow information to be presented to the user and/or other components or devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software or program modules. Generally, software includes routines, programs, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer-readable storage media".

"Computer-readable storage media" include volatile and non-volatile, removable and non-removable media implemented in any method or technology for storage of information such as computer readable instructions, data structures, program modules, or other data. Computer-readable storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

Conclusion

Various embodiments utilize certain events that occur within a Web browser to recognize an imminent intent, on the part of the user, to navigate to a website. Given such events, in combination with a user's past browsing patterns and history, an automated and personalized navigation solution can be provided to expedite navigation.

In one or more embodiments, a decay algorithm is employed to score URLs based on a user's visit frequency and visit recency. Based on a URL's score, an associated site can be selected for display in a layout that is configured to facilitate scan-ability, site recognition, and/or relevance of a site relative to other displayed sites.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method comprising:
   tracking site visits associated with a user's visits to multiple websites, individual tracked websites having an associated relevant visit count (RVC);
   applying a decay algorithm to one or more relevant visit counts based at least in part on how much time has passed since a last time the relevant visit count was decayed, the decay algorithm comprising:

$$Decay = \left(\frac{(R - (LV - LD))}{R}\right)$$

$$RVC_{new} = Decay * RVC_{old}$$

where:
   RVC is a calculated Relevant Visit Count;
   $RVC_{old}$ is a previously calculated Relevant Visit Count;
   $RVC_{new}$ is a newly calculated Relevant Visit Count;
   R is a number of relevant days being considered, where R is a value other than 0;
   LV is a number of days between a current time and a last time an associated URL was visited; and
   LD is a number of days between a current time and a last time the decay algorithm was applied; and
   presenting a layout having visual indicia associated with relevant websites, as represented by the websites' associated relevant visit count.

2. The computer-implemented method of claim 1, wherein the decay algorithm utilizes a user's visit frequency.

3. The computer-implemented method of claim 1, wherein said applying comprises applying the decay algorithm to a website's relevant visit count responsive to a user visiting the website.

4. The computer-implemented method of claim 1, wherein said applying comprises applying the decay algorithm across a history store that stores information associated with visited websites.

5. The computer-implemented method of claim 1, wherein said presenting comprises presenting no more than one visual indicia from a fully-qualified domain.

6. The computer-implemented method of claim 1, wherein said layout's visual indicia includes a plurality of tiles.

7. The computer-implemented method of claim 1, wherein said layout's visual indicia includes a plurality of tiles, each tile being associated with a different URL.

8. The computer-implemented method of claim 1, wherein said layout's visual indicia includes a plurality of tiles, and wherein at least some of the plurality of tiles include a site title and an image associated with an associated website.

9. The computer-implemented method of claim 1, wherein said layout's visual indicia includes a plurality of tiles, and wherein at least some of the plurality of tiles include a site title and an image associated with an associated website, wherein at least one image comprises a site-provided icon.

10. The computer-implemented method of claim 1, wherein said layout's visual indicia includes a plurality of tiles, and wherein at least some of the plurality of tiles include a site title and an image associated with an associated website, wherein said at least some of the plurality of tiles further include visual indicia associated with a particular website's relevance relative to other tile-associated websites.

11. The computer-implemented method of claim 1, wherein said layout's visual indicia includes a plurality of tiles, and wherein at least some of the plurality of tiles include a site title and an image associated with an associated website, wherein said at least some of the plurality of tiles further include visual indicia associated with a particular website's relevance relative to other tile-associated websites, wherein a visual property of the visual indicia associated with a particular website's relevance maps to the particular website's relevant visit count.

12. A system comprising:
   one or more processors; and
   a memory having instruction executable by the one or more processors to perform operations comprising:
      detecting an input associated with a navigation activity;
      responsive to detecting said input, presenting a layout having visual indicia associated with relevant websites, wherein said layout's visual indicia includes a plurality of tiles, each of which being associated with a computed relevant website, wherein the visual indicia associated with a particular website's relevance maps to an associated website's relevance as represented by a decayable relevant visit count; and
      applying a decay algorithm to the decayable relevant visit count based at least in part on how much time has passed since a last time the relevant visit count was decayed, the decay algorithm comprising:

$$Decay = \left(\frac{(R - (LV - LD))}{R}\right)$$

$$RVC_{new} = Decay * RVC_{old}$$

where:
   RVC is a calculated Relevant Visit Count;
   $RVC_{old}$ is a previously calculated Relevant Visit Count;
   $RVC_{new}$ is a newly calculated Relevant Visit Count;
   R is a number of relevant days being considered, where R is a value other than 0;
   LV is a number of days between a current time and a last time an associated URL was visited; and
   LD is a number of days between a current time and a last time the decay algorithm was applied.

13. The system of claim 12, wherein said input is associated with a new tab being opened.

14. The system of claim 13, the operations further comprising:
   responsive to said input, placing a canvas on top of where the new tab will reside; and
   performing processing associated with said opening the new tab in the background.

15. The system of claim 12, wherein said input is associated with an input other than one associated with a new tab being opened.

16. The system of claim 12, wherein at least some of the plurality of tiles include a site title and an image associated with an associated website.

17. The system of claim 12, wherein at least some of the plurality of tiles include a site title and an image associated with an associated website, and wherein at least one image comprises a site-provided icon.

18. The system of claim 12, wherein the visual indicia comprises a meter whose length maps to the associated website's relevance and is color-coded.

19. The system of claim 18, wherein at least some of the plurality of tiles include a site title and an image associated with an associated website, and the color of the color-coded meter is extracted from a primary color of the image.

20. The system of claim 12, wherein the computed relevant website comprises a fully-qualified domain.

21. The system of claim 12, the operations further comprising:
- providing an instrumentality in a tile of the plurality of tiles; and
- removing the tile from the layout responsive to selection of the instrumentality.

* * * * *